United States Patent [19]
de Kanter

[11] 3,976,220
[45] Aug. 24, 1976

[54] CHLORINATOR HAVING TRIP DEVICE ACTUATED BY LINE PRESSURE DIFFERENCE

[75] Inventor: Hendrik de Kanter, Santa Ana, Calif.

[73] Assignee: GRW & Associates, Inc., Tustin, Calif.

[22] Filed: July 24, 1975

[21] Appl. No.: 598,683

[52] U.S. Cl. ............................ 222/57; 137/101.11; 222/70; 251/81
[51] Int. Cl.² ...................... B67D 5/08; B67D 5/38
[58] Field of Search .................. 251/81; 137/87, 88, 137/98, 101.11; 222/57, 70, 498

[56] References Cited
UNITED STATES PATENTS

| | | | |
|---|---|---|---|
| 3,217,883 | 11/1965 | Griswold | 137/98 X |
| 3,369,705 | 2/1968 | Curtis et al. | 222/57 |
| 3,565,289 | 2/1971 | Erickson | 222/57 |
| 3,712,511 | 1/1973 | Magnasco | 137/101.11 X |

*Primary Examiner*—Robert B. Reeves
*Assistant Examiner*—David A. Scherbel
*Attorney, Agent, or Firm*—Flam & Flam

[57] ABSTRACT

A chlorinator for swimming pool systems which releases a charge of chemical in response to the pressure differences generated by the circulating pump. The time during which the discharge valve is open is automatically varied in accordance with the pump pressure in a flow line by way of a trip device.

17 Claims, 8 Drawing Figures

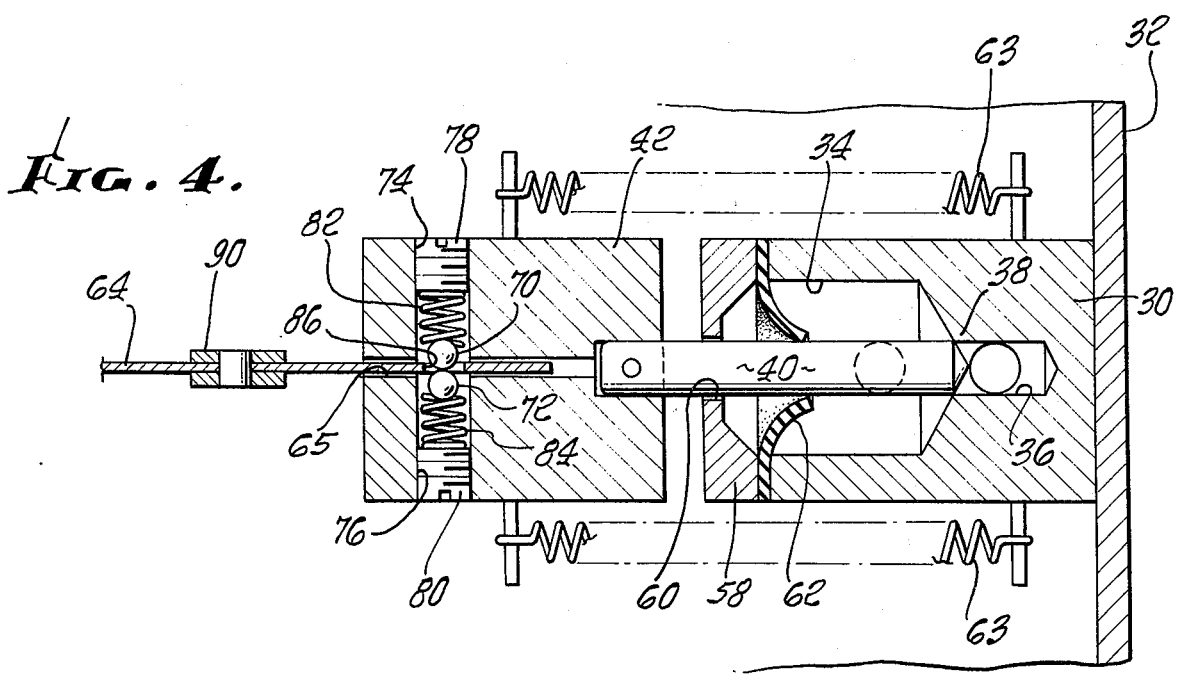
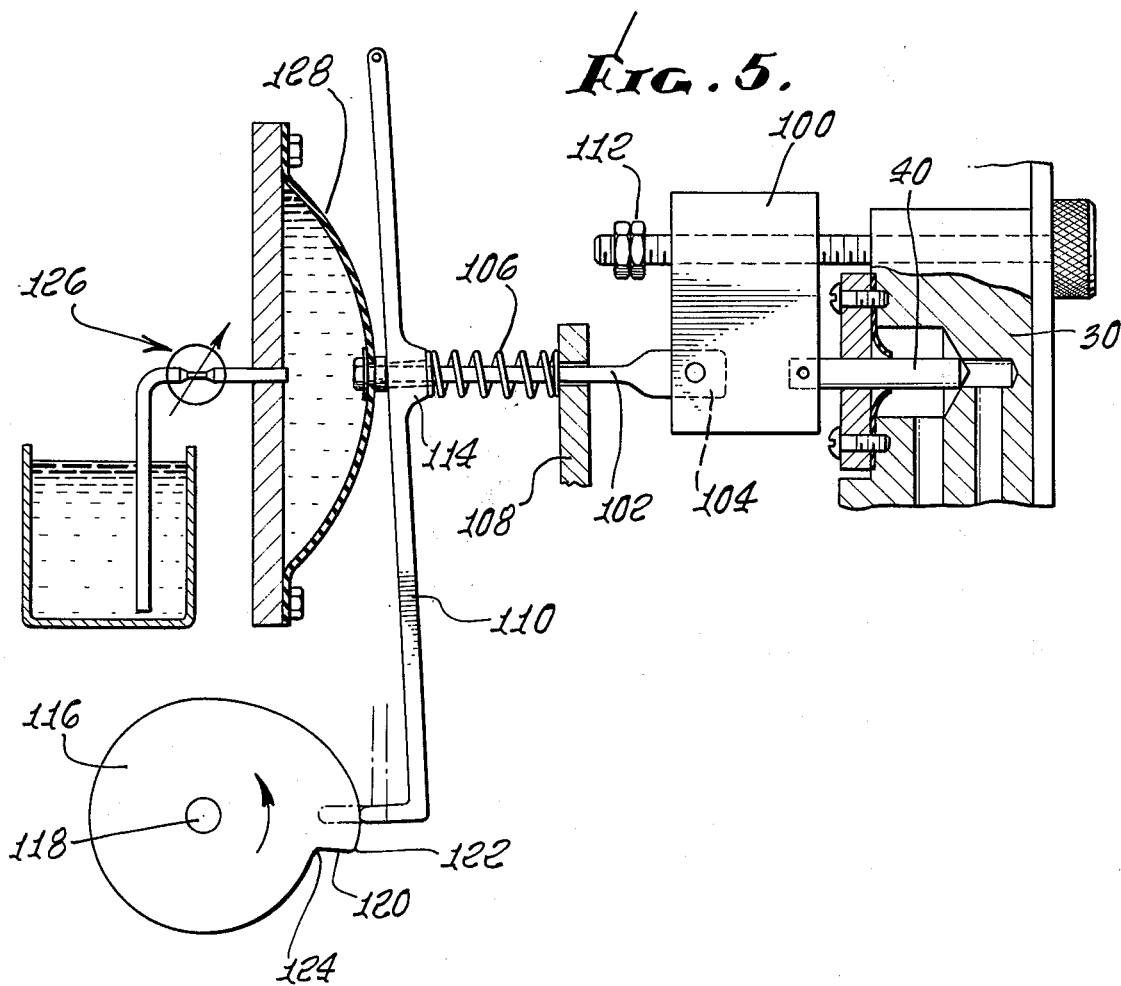

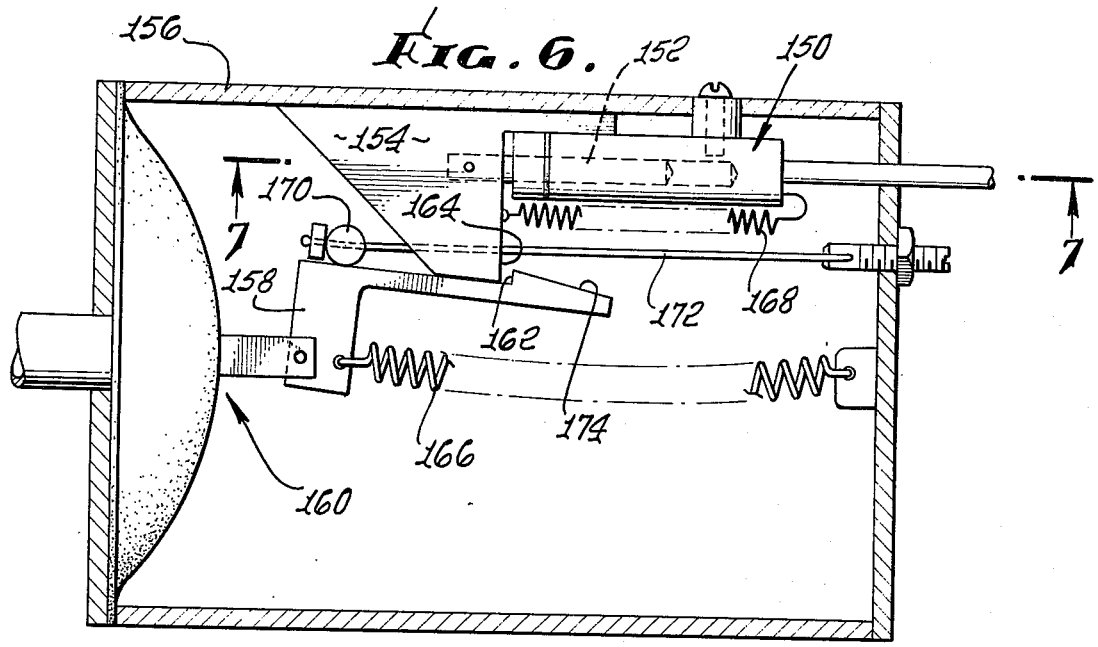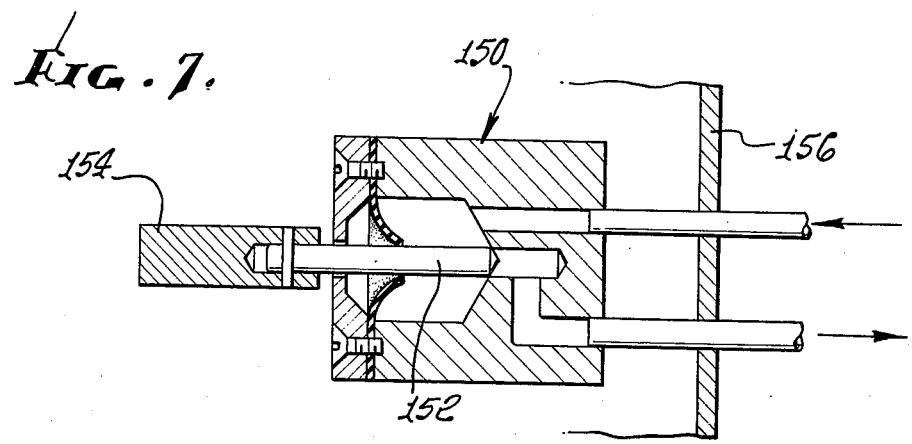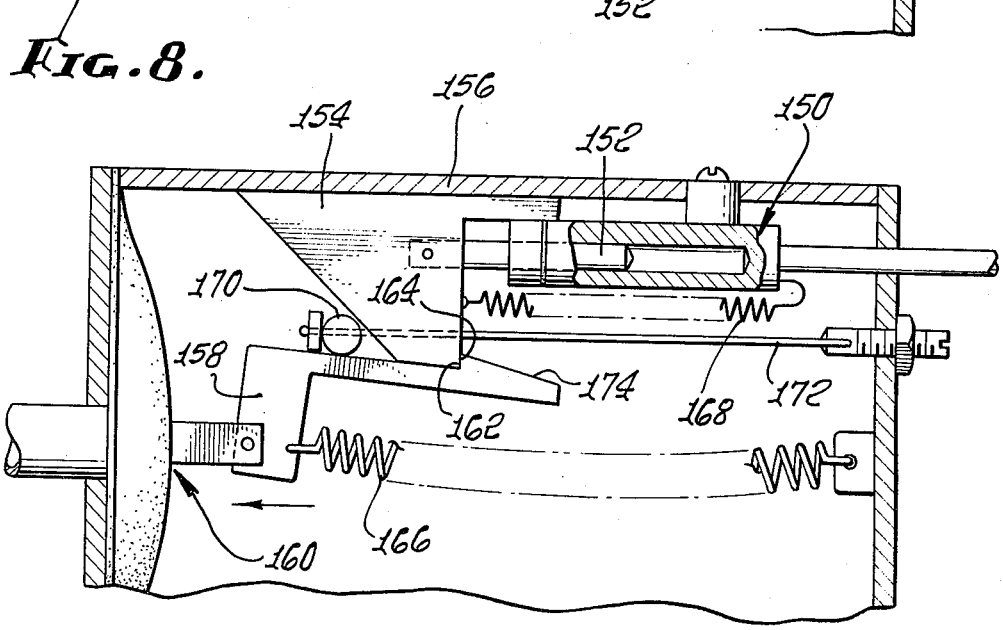

CHLORINATOR HAVING TRIP DEVICE ACTUATED BY LINE PRESSURE DIFFERENCE

FIELD OF THE INVENTION

This invention relates to chemical feeders, and more particularly to chlorinators for swimming pools or the like.

DISCUSSION OF THE PRIOR ART

There exists a substantial demand for an automatic chlorinator or chemical feeder for swimming pools or the like that provides the requisite chemical control of bacteria, algae, etc. Many biochemists believe the ideal arrangement is one in which a charge of chemical is injected into the system every time the pump is started. The biochemical needs of the pool are thus automatically attended to along with filtration and skimming which ordinarily receives attention by the pool owner or operator. In such an arrangement, the mechanism for releasing a charge of chemical desirably derives its power from the pressure differences generated by the circulating pump.

Systems of this general character are shown and described in U.S. Pat. No. 2,529,028 issued Nov. 7, 1970 to Everett W. Landon and U.S. Pat. No. 3,385,475 issued May 28, 1968 to Forrest A. Roby, Jr. The Landon system depends upon fluid switching functions being performed by flexible diaphragms, which is not altogether reliable since the seating areas may grow chemical deposits. The Roby system utilizes a quite complicated mechanism utilizing several valves.

The primary object of the present invention is to provide a chemical feeding system of this character that is so simple that it has a high reliability factor for consistent operation without significant maintenance.

Many governmental health authorities require that pool chemical be constantly injected into the system. The requirements among various geographical areas vary considerably. Accordingly another object of this invention is to provide a simple adjustable chemical feeder mechanism that can be adapted for this alternate mode of operation.

SUMMARY OF THE INVENTION

For the primary mode of operation, that is, by injection of chemical every time the pump starts, I indirectly control the volume of chemical discharged per pump start by controlling the time during which the discharge valve is opened. When the valve is open, the pump draws chemical into the system from the supply tank. No complicated mechanisms determine the exact volume of chemical so discharged. However the time of valve opening is an effective control whereby a single valve mechanism is all that is required.

The injection rate is dependent upon pump vacuum which cannot be accurately controlled. Hence it would seem that the the time of valve opening would not be an effective volume control. However, the time during which the discharge valve is open is also automatically varied in accordance with pump pressure whereby the quantity of discharge is regulated. Thus the valve remains open for a longer period if the pump pressure is low, and the valve remains open for a shorter period if the pump pressure is high.

In the alternate mode of operation, the valve is cycled often so that near continuous operation is achieved. The cycle rate is controlled by an adjustable timer that may have a cycle anywhere from a number of hours to a number of minutes. Again time of valve opening for each cycle is the control while, of course, the time is greatly shortened if the cycle period is small.

BRIEF DESCRIPTION OF DRAWINGS

A detailed description of the invention will be made with reference to the accompanying drawings wherein like numerals designate corresponding parts in the several figures.

FIG. 4 is a fragmentary sectional view taken along a plane corresponding to line 4—4 of FIG. 2.

FIG. 5 is a diagrammatic view of a modified form of feeder mechanism.

FIG. 6 is a diagrammatic view of still another modified form of the present invention.

FIG. 7 is a fragmentary sectional view taken along a plane corresponding to line 7—7 of FIG. 6.

FIG. 8 is a view similar to FIG. 6, but showing the valve in open position just prior to being tripped closed.

DETAILED DESCRIPTION OF PREFERRED EMBODIMENT

The following detailed description is of the best presently contemplated modes of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
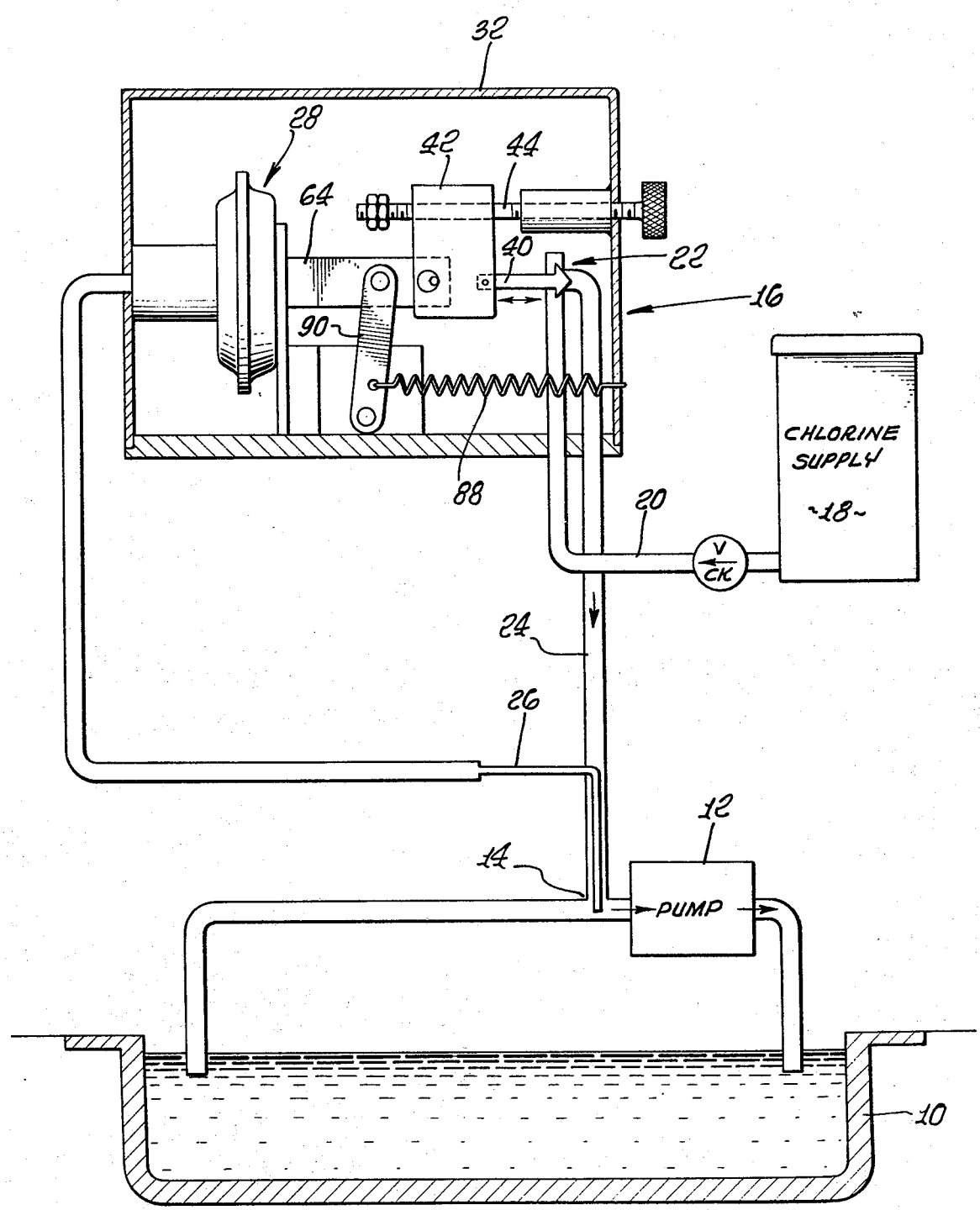
FIG. 1 is a diagrammatic view of a chemical feeder mechanism shown installed in a swimming pool system.

FIG. 1 diagrammatically illustrates a swimming pool 10 having a main pump 12 for circulating water through filters, heaters, etc. (not shown). The inlet to the pump is provided with a simple "T" fitting for connection of the chemical feeder unit 16 now to be described.

The chemical feeder unit 16 connects a supply tank 18 with the "T" fitting 14 for a predetermined time following initiation of pump operation. Thus a conduit 20 extends from the supply tank 18 to a control valve 22 (diagrammatically illustrated in FIG. 1) and thence to a conduit 24 and the "T" fitting 14. The valve 22 is normally closed but opens when a negative pressure or vacuum is first sensed at the "T" fitting 14.

In order to sense the existence of vacuum, a sensing tube 26 is provided. The tube 26 conveniently extends coaxially of the conduit 24 so as to reduce to one the number of connections required to the swimming pool system. The tube 26 actually projects well into the "T" to be subjected to the main stream vacuum. By judicious placement the suction force is equally strong in both the conduit 24 and sensing tube 26. The sensing tube 26 operates a fluid motor 28 in a manner hereinafter to be described to move the valve 22 open for a predetermined time following initiation of pump operation.

Figure 2:
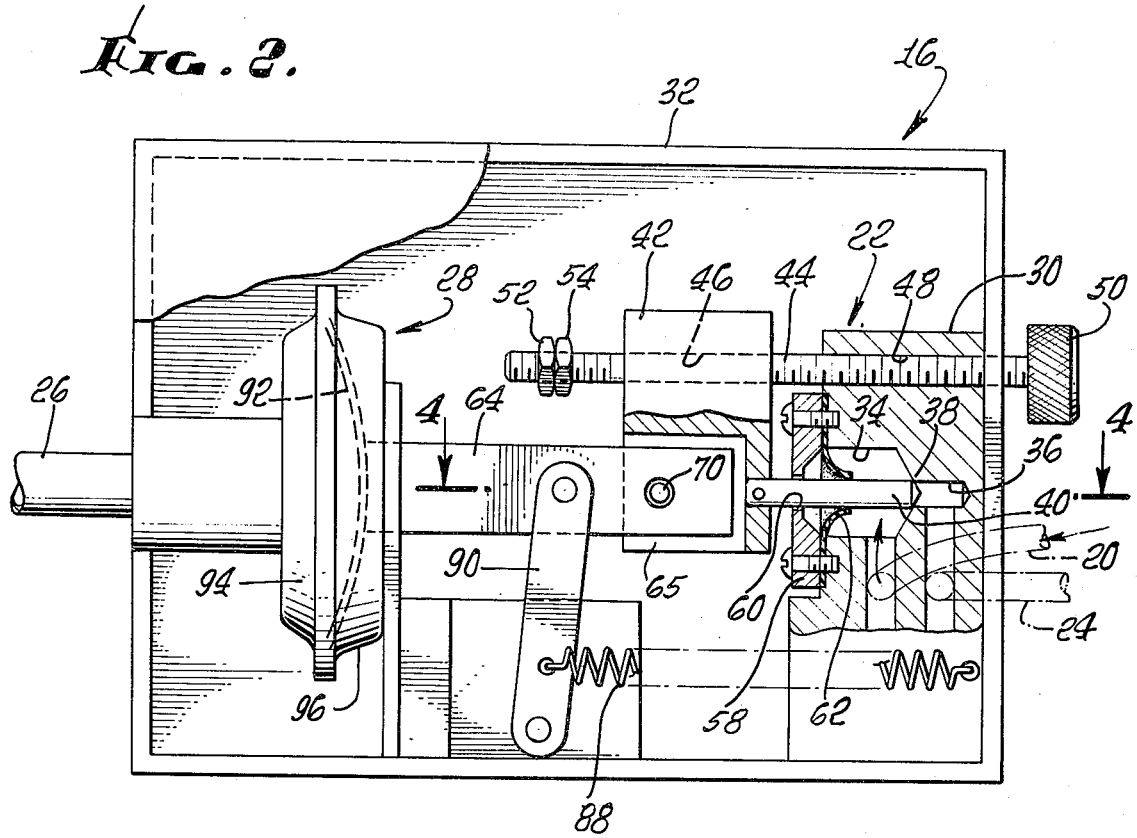
FIGS. 2 and 3 are views of the feeder mechanism shown in alternate positions.

The valve 22 as shown in FIG. 2 includes a valve block 30 fastened to the inside of a hollow case 32. The valve block 30 has a recess 34 in the bottom of which is a central outlet opening 36 that connects to the conduit 24. The edge formed by the opening 36 forms a valve seat 38 that cooperates with a piston-like valve closure 40.

A lateral inlet connects the conduit 20 to the valve recess 34. When the closure 40 is retracted, communication is established and fluid is drawn into the system by operation of the pump 12. The supply tank 18 is ordinarily located at about the level of the pump 12.

In order to retract the closure 40, a trip device or a linkage mechanism is provided that is operated by the fluid motor 28. The linkage includes releasably coupled parts that separate after a predetermined time of operation. This allows the closure 40 to return to interrupt flow of pool chemical while the pump continues to operate. One part of the linkage is a hollow guide block 42 that is located in front of the valve block 30 where it is directly attached to the rear end of the closure 40.

A guide rod 44 slidably mounts the hollow guide block 42 so that the closure 40 is movable toward and away from its seat. For this purpose, the block 42 has a long hole 46 at its top that slidably receives the rod 44. The right hand threaded end of the guide rod extends through a threaded hole 48 formed in the top of the valve block. The outer end of the rod is accessible beyond the case where it mounts an adjusting knob 50. By rotating the knob 50, stop nuts 52 and 54 carried at the inner end of the rod 44 are positioned to determine the permitted travel of the guide block 42.

A plate 58 covering the valve recess 34 has an aperture 60 that guides the closure 40 for movement toward and away from the seat. The plate 58 also clamps a stem seal 62 in place.

A pair of tension springs 63 located on opposite sides of the valve block 30 and guide block 42 (FIG. 4) urge the guide block in a direction normally to cause the valve to close.

The guide block 42 is retracted by a blade 64. One end of the blade extends into a narrow slot 65 in the guide block. A releasable coupling between the blade and the guide block 42 is achieved by a pair of spring pressed balls 70 and 72. The balls 70 and 72 are accommodated in laterally opening aligned recesses 74 and 76 that intersect the blade slot 65. The recesses are closed by threaded adjustment screws 78 and 80. Springs 82 and 84 are confined between the adjusting screws 78 and 80 at their outer ends and the balls 70 and 72 at their inner end. The balls are thus urged towards the blade.

The blade has a circular opening 86 that registers with the ball recesses when the blade is advanced into the block 42. When the blade opening 86 is so aligned, the springs 82 and 84 cause the balls to engage each other through the blade opening and to resist separation. When the blade 64 is moved in the direction to withdraw from the slot, namely to the left, the edge of the opening engages the balls. The spring force prevents the blade from driving them apart. The guide block 42 and the closure 40 are carried along and the valve opens.

Figure 3:
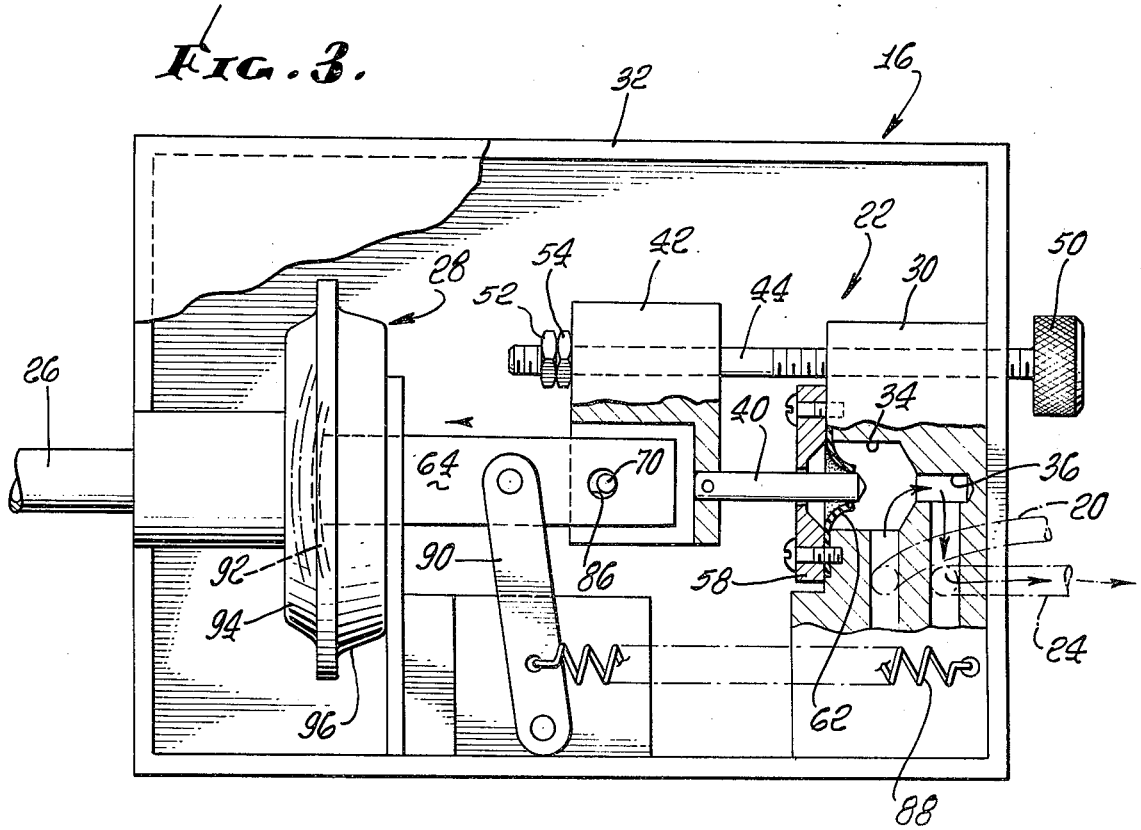

When the guide block 40 is moved a predetermined distance, the coupling is released and the valve snaps closed under the influence of springs 63. The stop nut 52 and 54 arrest movement of the block 42 while the blade 64 continues its movement, as shown in FIG. 3. The balls 70 and 72 are cammed apart and now ride along the opposite side surfaces of the blade. The block 40 advances and closes the valve notwithstanding the continued retracting movement of the blade.

The blade 64 is spring biased to reset upon reentry into the guide block slot 65 thus automatically to reestablish a coupling. This is achieved when retracting force on the blade is removed, as when pump 12 shuts down. For this purpose, a tension spring 88 (FIGS. 2 and 3) is provided that is anchored at one end in the valve block 30 and connected at the other end to a link 90. The link 90 is pivoted on the case 32 with its upper end linked to the blade 64.

The fluid motor 28 serves to retract the blade. The motor in this instance is a diaphragm mechanism. The center of the diaphragm 92 is clamped between case halves 94 and 96 to form two chambers. The blade 64 extends into the vented right-hand chamber where it connects to the diaphragm. The left-hand chamber is connected by the sensing tube 26 to the "T" 14.

When the pump 12 starts up, the motor 28 is powered by the pump vacuum and begins movement in a direction to retract the blade 64. But since the tube 26 has a restriction, movement is slow. Ultimately the coupling releases. During this time, a quantity of pool chemical is injected into the pump system.

When the pump shuts down fluid is slowly drawn back into the diaphragm chamber under the action of the spring 88 and the blade advances to the right. The releasable coupling is reestablished to condition the mechanism for operation when the pump again starts.

Other variables such as pump vacuum constant, the knob 50 provides a means for adjusting the time during which the valve 40 is opened. However, if the pump vacuum is increased, the blade 64 moves more quickly and the valve mechanism is open for a shorter time. But during this shorter time, the suction on the line 24 is higher and flow rate is higher. If the pump vacuum is lowered, the blade 64 moves more slowly and the valve is open for a longer period of time. But, during this longer period of time, the suction on the line 24 is less and the flow rate is less. For these reasons the volume injected into the system per cycle is made substantially constant. Good regulation can be achieved by controlling the relative size of the diaphragm chamber, the size of the sensing tube 26, the size of the supply conduit 24, etc.

In many cases, the pump 12 may be operated by a timer mechanism that turns the pump on once a day. No separate timer is required for the chemical feeder. The stop nuts 52 and 54 may be adjusted as determined from information fed back from the users of the pool and/or various sensing mechanisms to vary the quantity of pool chemical discharged per cycle.

Since a very simple and rather conventional type valve mechanism is utilized, maintenance is virtually eliminated. A reliable mechanism is provided for automatic injection of swimming pool chemical.

DESCRIPTION OF FIRST MODIFIED FORM

In the form of the invention disclosed in FIG. 5, essentially the same valve mechanism is shown including the valve block 30 and closure 40. The closure 40 is retracted by a guide block 100 similar to the guide block 42 of the previous form. The guide block 100 is retracted by a rod 102. The rod 102 has a flat blade portion 104 that cooperates with ball coupling members (not shown) carried by the block. The rod 102 and guide block 100 together form a trip device.

The rod 102 in the present instance is powered by a compression spring 106 that tends to move the rod 102 in a direction to retract the blade portion 104. For this purpose, the spring surrounds the rod 102 with one end of the spring engaging a fixed bar 108 and its other end positioned to engage the end of the rod 104 opposite the blade portion. When the spring operates to move the rod, a position is reached during the course of movement of the rod at which the blade portion 104 separates from the block 100, allowing the valve to close. As in the prior form, the position is determined by the setting of stop nuts 112.

A restraining link 110 periodically retracts the spring 106 which allows the rod to return and reconnect with the block 100. The restraining link 110 is pivoted at one end. The center of the link 110 has an apertured hub part 114 through which the rod 102 extends. The power spring 106 engages the hub 114. The free end of the pivoted link 110 follows a cam that slowly rotates on a timing shaft 118. The cam has a shoulder that abruptly connects the cam high point 122 with its low point 124. The low point 122 connects with the high point 124 through a very gradual ramp surface. The power spring 106 urges the restraining link 110 to engage the cam 116. When the link 110 clears the high point, the power of the spring 106 is transferred from the cam 116 to the rod 102. The rod 102 advances, but at restrained rate.

In order to restrain the rate of movement of the rod, a spring device 126 is provided. The spring device slowly yields to the force of the rod and slowly returns to a normal position when the force of the rod is removed. A structure for accomplishing such function is diagrammatically illustrated as a collapsible resilient bag 128 filled with fluid with its interior communicating with a fluid reservoir through a restriction. The bag directly connects with the end of the rod 102. Other slowly yielding spring devices could be substituted.

As soon as the spring force 106 is transferred to the rod 102 and spring device 126, the rod slowly retracts to achieve the timed value opening function previously described. Before the restraining link 110 reengages the cam surface, the releasable coupling with the block 100 must first separate in order that the rod be properly controlled. The characteristics of the yielding spring device relative to the cycle of the cam are carefully selected.

When the restraining link 110 does reengage the cam surface, which may be at some fraction of the cam period, the force of the spring 106 is transferred from the rod 102 and spring device 126 back to the cam. Thereupon, the spring characteristics of the device 126 cause the rod to follow until the mechanism is reset awaiting another cycle of operation to be initiated by the cam shoulder 120.

The speed of the cam shaft 118 can be selected to determine the period between successive cycles of the valve. Obviously the period can be selected to be as much as twenty four hours (or more, if desired) to as little as a few minutes. By locating the stop nuts 112, the time that the valve is open during each cycle is adjusted. These characteristics are determined with respect to size of the water systems being treated as well as with respect to other specifications of the water system. With a short cam period and small time of valve opening, continuous feed is closely approximated. With a long cam period and a large time of valve opening, the shock type treatment is achieved

DESCRIPTION OF SECOND MODIFIED FORM

In the form of the invention shown in FIGS. 6, 7 and 8, a valve block 150 is provided that is similar to the valve blocks of the previous forms. A valve closure 152 is connected to a guide block 154 that has a surface that slides along the inside of a case 156.

A sear link 158, like the blade 64 or rod 102 of the previous forms, serves to retract its guide block with a releasable coupling therebetween. For this purpose, the sear link 158 is connected to a fluid motorized member 160 that is either fluid powdered by the main pump as in the first described form or spring powered under control of a cam and restraining link as in the second form.

Angular movement of the sear link 158 in one direction moves its sear surface 162 into coupling relationship with a corner 164 of the guide block 154 while angular movement of the sear link in the opposite direction moves the sear surface 162 out of the corner for trip release of the guide block 154. A tension spring 166 urges the link in the coupling direction.

The tension spring 166 is anchored at one end to a wall of the case 156 opposite the motorized member 160. The other end of the spring is attached to the link 158 at a place located relative to its pivotal mounting as to urge the link 158 into coupling relationship.

When the motorized member 160 is powered, the link 158 slowly moves up with it. The guide block 154 is carried along. The valve opens. Upon sufficient movement corresponding to a time interval, the sear link 158 is moved to release the guide block 154 to allow the valve to close under the influence of a retracting spring 168. For this purpose, a stop in the form of a wedge 170 is provided. The wedge 170 floats on the end of a flexible strip 172 that is adjustable anchored upon a wall of the case. The top of the link 168 and the rear of the guide block 154 form a tapered space in which the wedge 170 is accommodated. As the corner of the tapered space approaches the wedge (FIG. 8), the sear link 158 is forced to move away from the corner 164 and to release the guide block 154. The position of the wedge is adjusted by suitable screw means such as shown thus to vary the volume.

Subsequent to release of the guide block and closure of the valve, the motorized member 160 and link 158 continue slowly to move. When the power is removed from the motorized member 160, the link 158 returns under the influence of the spring 166. A cam surface 174 adjoining the sear surface 162 cooperates with the under surface of the guide block 154 to achieve automatic recoupling. The cycle can then be repeated under control of the timing mechanism or pump.

Intending to claim all novel, useful and unobvious features shown or described, I claim:

1. In a chemical feeder mechanism for a body of fluid:
   a. a valve for controlling communication between a chemical solution and another body of fluid;
   b. a trip device having one part connected to said valve and having a second part;
   c. motor means connected to said second part for slowly moving said second part in a direction to open said valve when said trip device is coupled;
   d. means operable upon predetermined movement of said one part for tripping said trip device whereby said valve is free to move to closed position;

e. means for moving said valve to closed position following tripping of said trip device; and f. said trip device being reset upon return movement of said second trip device part.

2. The chemical feeder as set forth in claim 1 together with means for cyclically operating said motor means.

3. The chemical feeder as set forth in claim 1 together with means for adjusting the position at which said tripping means is operative whereby the time period of valve opening is varied thus to determine the volume of chemical introduced.

4. The chemical feeder as set forth in claim 3 together with a circulating pump for said body of fluid and means for operating said motor means when pump operation is initiated.

5. The chemical feeder as set forth in claim 3 together with a circulating pump for said body of fluid, said motor means being fluid operated and connected through a restriction, to one side of said pump.

6. The chemical feeder as set forth in claim 3 together with a circulating pump for said body of fluid; said motor means being fluid operated and connected through a restriction, to one side of said pump; said valve having a discharge side also connected to one side of said pump whereby the rate of movement of said pump motor and the rate of injection of chemical solution both vary correspondingly with pump pressure thus to maintain volumetric displacement per cycle regulated.

7. The chemical feeder as set forth in claim 1 together with a timer for cyclic operation of said motor means.

8. The chemical feeder as set forth in claim 1 together with a timer for cyclic operation of said motor means, said motor means including a power spring cyclically retracted by a cam forming a part of said timer, said motor means also including a yielding spring device for return movement of said second trip device part.

9. The chemical feeder as set forth in claim 1 together with means for adjusting the position at which said tripping means is operative whereby the time period of valve opening is varied thus to determine the volume of chemical introduced, said adjusting means comprising a stop interposed in the path of retracting movement of said one trip device part, and said trip device parts being yieldingly coupled by spring means.

10. The chemical feeder as set forth in claim 1 together with means for adjusting the position at which said tripping means is operative whereby the time period of valve opening is varied thus to determine the volume of chemical introduced, said adjusting means comprising a wedge interposed between opposed surfaces of said trip device parts and operative to move said trip device parts away from a normal position to separate the same upon predetermined retracting movement of said trip device parts.

11. In a chemical feeder mechanism for a fluid system having a pump:

a. a normally closed valve for controlling the flow of chemical to the system;

b. a two part linkage for moving the valve to open position;

c. a resettable releasable coupling between said linkage parts;

d. one of said parts being connected to said valve;

e. fluid motor means connected to the other of said parts and operable to move said linkage parts when coupled to valve opening position;

f. a fluid power connection between said pump and said fluid motor means;

g. means restricting the movement of said motor means whereby time is consumed during movement of said linkage; and h. means operable upon a predetermined movement of said linkage to release said releasable coupling.

12. The chemical feeder as set forth in claim 11 in which said valve has an outlet connected to said fluid system whereby the rate of flow of chemical into the system is a function of system pressure; said restricting means being a small cross section part of said fluid power connection whereby said fluid motor means also operates at a rate that is a function of system pressure whereby volumetric regulation of injected chemical is obtained.

13. A chemical feeder mechanism for a swimming pool system or the like having a circulating pump:

a. a normally closed valve for controlling the flow of chemical from a supply tank, said valve having an outlet and a movable valve closure;

b. a fluid motor for moving said valve closure;

c. means biasing said fluid motor in one direction;

d. conduit means connecting said fluid motor to said pump inlet, said conduit means having a restriction to limit the rate of operation of said fluid motor;

e. a releasable latch between said closure and said fluid motor for movement of said closure by said fluid motor; and f. means for releasing the latch upon predetermined movement of said closure whereby said valve returns to closed position notwithstanding continued operation of said fluid motor.

14. The chemical feeder as set forth in claim 13 in which said latch is a friction catch to reestablish a coupling between said closure and said fluid motor when said fluid motor is deenergized.

15. The chemical feeder as set forth in claim 13 in which said releasing means is adjustable to vary the volume discharged per cycle of operation.

16. The chemical feeder as set forth in claim 13 together with conduit means connecting said valve outlet to the pump inlet.

17. The chemical feeder as set forth in claim 13 together with conduit means connecting said valve outlet to the pump inlet; said releasing means being adjustable to vary the volume discharged per cycle.

* * * * *